United States Patent [19]
James et al.

[11] Patent Number: 4,812,242
[45] Date of Patent: Mar. 14, 1989

[54] METHOD OF ENCAPSULATING ORGANIC MATERIAL

[75] Inventors: Keith James, Carshalton; Graham M. Pring, Woking, both of England

[73] Assignee: The British Petroleum Company p.l.c., London, England

[21] Appl. No.: 88,990

[22] Filed: Aug. 21, 1987

Related U.S. Application Data

[63] Continuation of Ser. No. 736,338, May 21, 1985, abandoned.

[30] Foreign Application Priority Data

May 31, 1984 [GB] United Kingdom ............... 8413911

[51] Int. Cl.$^4$ ................................................ C02F 1/40
[52] U.S. Cl. ................................. 210/735; 210/734; 210/747; 210/751; 210/925; 134/4; 264/4
[58] Field of Search ............... 210/732, 734, 735, 736, 210/751, 922, 924, 925, 747; 264/4, 4.6; 252/315.2, 316; 134/4

[56] References Cited

U.S. PATENT DOCUMENTS

| | | | |
|---|---|---|---|
| 2,828,265 | 3/1958 | Van Strien | 252/315.2 |
| 2,971,922 | 2/1961 | Clem | 252/315.2 |
| 3,049,498 | 8/1962 | Sawyer | 252/315.2 |
| 3,198,731 | 8/1965 | Lew | 210/751 |
| 3,367,869 | 2/1968 | Silver | 252/35 |
| 3,415,745 | 12/1968 | Isaacson | 210/922 |
| 3,460,922 | 8/1969 | Winkler | 44/7 |
| 3,544,609 | 12/1970 | Forbes | 260/429.9 |
| 3,577,515 | 5/1971 | Vandegaer | 424/32 |
| 3,718,445 | 2/1973 | Troffkin | 44/7 C |
| 3,797,646 | 3/1974 | Horne | 206/47 A |
| 3,816,359 | 6/1974 | Creamer | 260/2.5 S |
| 3,869,385 | 3/1975 | Stanley | 210/925 |
| 3,883,397 | 5/1975 | Townsley | 210/922 |
| 3,915,855 | 10/1975 | Teng | 210/924 |
| 3,919,083 | 11/1975 | O'Sullivan | 210/54 |
| 4,206,080 | 6/1980 | Sato | 252/430 |
| 4,230,566 | 10/1980 | Faudree | 210/693 |
| 4,497,663 | 2/1985 | Fisher | 210/735 |

FOREIGN PATENT DOCUMENTS

| | | | |
|---|---|---|---|
| 2338112 | 2/1975 | Fed. Rep. of Germany | 210/924 |
| 53-30476 | 3/1978 | Japan | 210/915 |
| 723456 | 7/1952 | United Kingdom | 210/735 |
| 771584 | 6/1955 | United Kingdom | 210/735 |

*Primary Examiner*—Ernest G. Therkorn
*Attorney, Agent, or Firm*—Morgan & Finnegan

[57] ABSTRACT

Organic material, particularly organic material floating on a water surface, can be encapsulated by reacting, in the presence of the organic material, (A) a functionalized liquid polymer containing anhydride functional groups which groups are derived from an alpha, beta-ethylenically unsaturated dicarboxylic acid anhydride and (B) an alkoxylated fatty monoamine or polyamine having from 1.5 to 15 moles of alkoxylate per mole of fatty amine. The functionalized polymer (A) may be, for example, maleinized polybutadiene and the alkoxylated fatty amine may be, for example, N,N$^1$, N$^1$-tris (2-hydroxypropyl)-N-oleyl-1,3-diaminopropane. Preferably, the alkoxylated fatty amine is derived from a fatty amine having an iodine value of at least 65. The method may also be used to encapsulate a solid contaminated with organic material e.g. oil drilling cuttings.

12 Claims, No Drawings

METHOD OF ENCAPSULATING ORGANIC MATERIAL

This is a continuation of application Ser. No. 736,338 filed on May 21, 1985, now abandoned.

METHOD OF ENCAPSULATING ORGANIC MATERIAL

The present invention relates to a method of encapsulating organic material. In particular the invention relates to a method of encapsulating organic material floating on the surface of, or otherwise associated with, water.

Published European Patent Application No. EP 0023084 discloses a method for cross-linking a functionalised polymer in the presence of organic material, the method comprising reacting a liquid polymer which is miscible with the organic material and which contains functional groups with a cross-linking agent which is also miscible with the organic material and which contains complementary functional groups and allowing a three dimensional polymer network to form. The functional groups on the polymer may be carboxylic acid, anhydride or acid chloride groups and the complementary functional groups may be amine groups and/or alcohol groups.

The selection of the cross-linking agent is an important aspect of the method disclosed in EP-A-0023084. It is generally known that polymers containing carboxylic acid, anhydride or acid chloride groups can be cross-linked with amines or alcohols. However, many of the known cross-linking agents are unsuitable for use in the method disclosed in the published European application because of lack of miscibility in organic materials and/or because of slow curing rate at ambient temperature i.e. circa 20° C.

When the cross-linking agent is to be used to encapsulate organic material floating on water, it is preferably also relatively water insoluble and does not disperse the organic material in the water to any great extent.

It has now been found that certain alkoxylated fatty amines are particularly suitable for use as cross-linking agents because they are hydrolytically stable liquids which have a low degree of dispersancy of organic material in water and are substantially insoluble in water.

According to the present invention a method of encapsulating organic material comprises reacting in the presence of the organic material (A) a functionalised liquid polymer containing anhydride functional groups which functional groups are derived from an $\alpha, \beta$ ethylenically unsaturated dicarboxylic acid anhydride and (B) a cross-linking agent, the functionalised polymer and the cross-linking agent being miscible with the organic material, and capable of cross-linking to form a three-dimensional polymer network containing encapsulated organic material, and allowing a three-dimensional polymer network to form, characterised in that the cross-linking agent is an alkoxylated fatty monoamine or polyamine having from 1.5 to 15 moles of alkoxylate per mole of fatty amine. The alkoxylate groups are preferably selected from the group comprising ethoxylate, propoxylate and butoxylate groups or mixtures thereof.

For use in encapsulating organic material which is floating on or is otherwise associated with water, the functionalised polymer and the cross-linking agent are preferably substantially insoluble in water. In addition the reactants preferably have relatively low dispersancy i.e. they do not disperse substantial amounts of the organic material in the water.

It has been found that when the organic material to be encapsulated is floating on, or otherwise associated with, water, e.g. as a water-in-oil emulsion, the alkoxylated fatty amine preferably has a certain amount of unsaturation and has an alkoxylate content of from 1.5 to 10 for a monoamine and from 2.5 to 15 for a polyamine.

The invention therefore includes a method of encapsulating organic material which is floating on, or otherwise associated with, water which method comprises reacting in the presence of the organic material and water (A) a functionalised liquid polymer containing anhydride functional groups which functional groups are derived from an $\alpha, \beta$ ethylenically unsaturated dicarboxylic acid anhydride and (B) a cross-linking agent, the functionalised polymer and the cross-linking agent being miscible with the organic material and capable of cross-linking to form a three-dimensional polymer network containing encapsulated organic material, and allowing a three-dimensional polymer network to form, characterised in that the cross-linking agent comprises at least one alkoxylated fatty amine selected from the group comprising (a) an alkoxylated fatty monoamine having from 1.5 to 10 moles of alkoxylate per mole of fatty monoamine, the major proportion of alkoxylate groups being selected from ethoxylate and propoxylate groups and the alkoxylated fatty monoamine being derived from a fatty amine having an iodine value of at least 45.

(b) an alkoxylated fatty polyamine having from 2.5 to 15 moles of alkoxylate per mole of fatty polyamine, the major proportion of alkoxylate groups being selected from ethoxylate and propoxylate groups and the alkoxylated fatty polyamine being derived from a fatty amine having an iodine value of at least 45.

(c) an alkoxylated fatty monoamine having from 1.5 to 10 moles of alkoxylate per mole of fatty monoamine, the major proportion of the alkoxylate groups having at least four carbon atoms and the alkoxylated fatty monoamine being derived from a fatty amine having an iodine value of at least 10 and (d) an alkoxylated fatty polyamine having from 2.5 to 15 moles of alkoxylate per mole of fatty polyamine, the major proportion of the alkoxylate groups having at least four carbon atoms and the alkoxylated fatty polyamine being derived from a fatty amine having an iodine value of at least 10.

The alkoxylated fatty monoamines or polyamines having a major proportion of ethoxylate and/or propoxylate groups are preferably derived from fatty amines having an iodine value of at least 60. The alkoxylated fatty monoamines or polyamines having a major proportion of alkoxylate groups with at least four carbon atoms are preferably derived from fatty amines having an iodine value of at least 30. The alkoxylate groups of the alkoxylated fatty amines are preferably selected from the group comprising ethoxylate, propoxylate and butoxylate groups.

For use at relatively low ambient temperatures, e.g. less than $-10°$ C., the alkoxylated fatty monoamine or polyamine cross-linking agent is preferably derived from a fatty amine having an iodine value of at least 65.

The iodine value is a measure of the degree of unsaturation of the alkyl group of the fatty amine from which the cross-linking agent is derived and is the number of grams of iodine that combine with one hundred grams of the fatty amine. The iodine value may be determined by standard test method ASTM D 2075.

The term "liquid polymer" means in this specification a liquid polymer or a solution or dispersion of a polymer in a suitable solvent or diluent which is liquid at ambient temperature i.e. circa 20° C. and is preferably a liquid with a viscosity of not more than 2 Nsm$^{-2}$ at 25° C.

The term "miscible with the organic material" means in this specification that the functionalised liquid polymer and cross-linking agent can be dispersed through and are preferably soluble in the organic material. The relatively long chain hydrocarbyl group derived from a fatty acid generally imparts sufficient solubility to the crosslinking agent. In the case of a functionalised liquid polymer or a cross-linking agent which is not miscible per se, miscibility may be conferred by dispersing or dissolving the polymer or cross-linking agent in a suitable diluent or solvent which is itself miscible with the organic material.

Alkoxylated fatty monoamines and polyamines are known and some are commercially available. They may be prepared by alkoxylating fatty amines by known methods. The fatty amines are derived from a $C_8$ to $C_{22}$ compound containing one or more fatty acid. The fatty acids may be saturated, but, as stated above, they are preferably unsaturated. Alkoxylated fatty monoamines and polyamines suitable for use in the present invention include one or more of those having a general formula as follows:

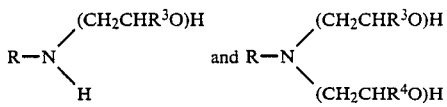

where R is a hydrocarbyl group having from 8 to 22 carbon atoms $R^1$ is $(CH_2)_3$ or $CH_2CH(CH_3)CH_2$, $R^2$, $R^3$ and $R^4$ are the same or different and are H, $CH_3$ or $CH_2CH_3$, n is 0 or a positive integer from 1 to 3, x, y and z are the same or different and are 0 or a positive integer from 1 to 6, where at least one of x,y or z=1 and the sum of nx,y and z is from 1.5 to 15

If x, y or z is greater than 1, then the alkoxylate group may be a mixture of alkoxylates. For example if y=3 then $(CH_2CHR^3O)_y$ may comprise two ethoxylate groups and one propoxylate group.

The extent of alkoxylation is the number of moles of alkoxylate per mole of fatty amine i.e. in the above formula, the extent of alkoxylation of a monoamine is y+z and of a diamine is nx+y+z. However, in practice an alkoxylated fatty amine is likely to be a mixture of amines having the above general formula. Therefore, although x, y and z are integers or zero, the extent of alkoxylation is not necessarily an integer. For example, a 50:50 mixture of two alkoxylated fatty amines having the general formulae;

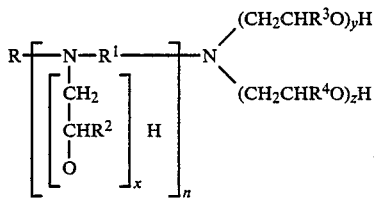

where R, $R^3$, $R^4$ are as given above, would have an extent of alkoxylation of 1.5.

Increasing the extent of alkoxylation of the alkoxylated fatty amine tends to increase the time taken to form a three dimensional polymer network encapsulating organic material according to the method of the present invention and also tends to lower the strength of the polymer network formed. Increasing the length of the alkoxylate chain tends to decrease the rate of reaction between the cross-linking agent and the functionalised liquid polymer. Increasing the extent of ethoxylation of the cross-linking agent also tends to increase the solubility of the compound in water whereas the some cross-linking agents, particularly diamines, decreasing the extent of ethoxylation may increase the dispersant properties of the compound. In general, cross-linking agents containing butoxylate groups have a lower degree of dispersancy than cross-linking agents containing propoxylate groups which in turn have less dispersancy than crosslinking agents containing ethoxylate groups. Polyamines generally give harder gels than monoamines but tend to have a greater degree of dispersancy.

When the method according to the present invention is used to encapsulate organic material floating on, or otherwise associated with, water, the cross-linking agent preferably has a low water solubility so that the amount of the compound lost by dissolving into the water is minimised. Also the compound preferably has a low degree of dispersancy. The selection of the characteristics of the cross-linking agent therefore requires a certain amount of compromise between the various properties of the cross-linking agent. Thus, for use in association with water, the cross-linking agent preferably comprises at least one alkoxylated fatty amine selected from;

(a) an ethoxylated fatty monoamine having an extent of ethoxylation of from 1.5 to 4 the ethoxylated fatty monoamine being derived from a fatty amine having an iodine value at least 60.

(b) a propoxylated fatty monoamine having an extent of propoxylation of from 1.5 to 3, derived from a fatty amine having an iodine value of at least 60

(c) a butoxylated fatty monoamine having an extent of butoxylation of from 1.5 to 6, derived from a fatty amine having an iodine value of at least 30 and (d) an alkoxylated fatty polyamine having from 2.5 to 6 moles of alkoxylate groups selected from ethoxylate, propoxylate and butoxylate groups per mole of fatty polyamine, the alkoxylated fatty polyamine being derived from a fatty amine having an iodine value of at least 60, and more preferably at least 65.

Particularly suitable cross-linking agents for use in the method according to the present invention include;
bis(2-hydroxyethyl)oleylamine,
bis(2-hydroxyethyl)soyaamine,
N,N',N'-tris(2-hydroxypropyl)-N-oleyl-1,3-diaminopropane,
N,N',N'-tris(2-hydroxybutyl)-N-oleyl-1,3-diaminopropane,
N,N',N'-tris(2-hydroxyethyl)-N-soya-1,3-diaminopropane.

Compounds similar to the above but having a higher extent of alkoxylation are also suitable.

The most suitable α,β-ethylenically unsaturated dicarboxylic acid anhydride for use in the present invention is maleic anhydride.

The functionalised liquid polymer may be prepared using any polymer capable of being functionalised with an α,β-ethylenically unsaturated dicarboxylic acid anhydride. The polymer may be a homopolymer or a copolymer and is preferably a polyolefin, more particularly a polymer of a mono- or di-olefin. The polyolefins may be derived in known manner from conjugated dienes such as butadiene, isoprene and mono-olefins such as isobutene and 4-methylpentene-1. Suitable polymers may also be obtained by functionalising linear mono-olefins such as ethylene and/or propylene. Polymers derived from naturally occurring substances may also be used, provided they can be functionalised e.g. linseed or soya bean oil and natural rubber.

The molecular weight of the polymer may vary widely depending on its type and may range from 250 (e.g. linseed oil) to $1 \times 10^6$ or more (e.g. natural rubber) with intermediate values for synthetic polymers (e.g. 5000 to 20 000 for maleinised polybutadiene and 200 000 to 500 000 for maleinised polyisoprene).

Methods of functionalising saturated and unsaturated polymers with an α,β-ethylenically unsaturated dicarboxylic acid anhydride are known. The extent of functionalisation, i.e. the parts by weight of the anhydride functional groups per 100 parts by weight of the polymer, depends, inter alia, upon the type of polymer and the method used to functionalise it. Typically the extent of functionalisation may range from 1 (e.g. natural rubber) to 50 (e.g. linseed oil). Preferably the extent of functionalisation is from 1 to 20, more preferably 5 to 20.

There may be residual unsaturation remaining after functionalisation of the polymer without adversely affecting the formation of a three dimensional method according to the method of the present invention.

The functionalised polymer preferably has a relatively long chain with little or no branching between the functional groups. The molecular weight of the functionalised polymer may thus be relatively high, but this has to be balanced against the fact that relatively large amounts of solvent may be required to give a liquid polymer as hereinbefore defined. Since the solvent used will be encapsulated in the three-dimensional polymer network formed, this may reduce the capacity for encapsulating the organic material.

A particularly suitable functionalised polymer for use in the method according to the present invention is maleinised polybutadiene. Maleinised polybutadienes are commercially available and typically have molecular weights in the range 1000 to 30,000. The molecular weight of maleinised polybutadienes used in the present invention is preferably from 5000 to 30,000.

The method according to the present invention may be used in a variety of situations and for encapsulating a variety of organic materials. The organic material to be encapsulated may be solid or liquid, preferably the latter, and may be any organic material in which the reaction product and cross-linking agent are miscible. The method may also be used to encapsulate solids contaminated with organic material such as, for example, drilling cuttings. The method according to the invention may be used to gel hydrocarbons such as crude oil and petroleum products as well as potentially hazardous organic materials such as, for example, halogenated hydrocarbons, organo-phosphates benzene and inflammable or toxic organic liquids generally.

The most common use of the method is likely to be the treatment of leakages or spillages of organic materials which may occur during storage, transport or processing of such materials. The method is particularly useful where the organic material is floating on, or otherwise associated with, water. One particularly important use of the method according to the invention is therefore the treatment of crude oil or petroleum products spilt on water.

It will be apparent that not all of the potential uses of the method will have the same requirements. For example, the organic material may be at a temperature above or below ambient temperature, or the rapid rate of formation of a three-dimensional network may not be essential. Nevertheless, for the invention to have wide applicability the following requirements are desirable:

(i) The reactants are relatively water insoluble,
(ii) The cross-linking reaction between the reaction product and the cross-linking agent occurs relatively rapidly e.g. the reactants are preferably capable of forming a three-dimensional polymer network within an hour at about 20° C.,
(iii) The cross-linking reaction is preferably capable of occurring at relatively low ambient temperatures e.g. at temperatures below 15° C. and preferably as low as −20° C.,
(iv) The cross-linking reaction is capable of occurring in relatively inhospitable conditions e.g. in the presence of sea water, sand, rock, debris etc,
(v) The method is capable of encapsulating a weight of organic material which is at least equal to and is preferably at least three times the weight of the reactants.
(vi) The three-dimensional polymer network formed by the method is preferably sufficiently solid to be capable of being handled by conventional solids handling equipment e.g. in the case of oil spilt on water, the polymer network can be recovered with nets.
(vii) The polymer network is relatively stable so that the organic material is not easily separated from the polymer network.
(viii) The reactants and the polymer network formed are relatively non-toxic.

The method according to the present invention is capable of satisfying these requirements.

The functionalised polymer and the cross-linking agent are preferably used in a molar ratio of 3:1 to 1:3 based on the molar ratio of the functional groups of the polymer and cross-linking agent. More preferably sufficient cross-linking agent is used to react with substantially all of the anhydride groups of the functionalised polymer i.e. the ratio of functional groups of the cross-linking agent to the anhydride groups of the functionalised polymer is preferably from 2:1 to 0.8:1. The amount of functionalised polymer added to the organic material is preferably from 0.1 to 30% by weight of the organic material, preferably from 1 to 25% by weight.

The cross-linking agent and functionalised polymer may be used in conjunction with a suitable solvent or diluent. Suitable solvents or diluents include hydrocarbon solvents (e.g. naphtha, white spirit, kerosine, gas oil or toluene) or other organic solvents e.g. (ketones, ethers and esters). For treating oil spilt on water and other uses, it may be desirable to use a solvent of low toxicity e.g. a de-aromatised kerosine or gas oil such as are currently used as solvents for oil spill dispersants.

The functionalised polymer and the cross-linking agent may be added to and mixed with the organic material in any convenient manner and in any order. For example, when the organic material is floating on water, the reactants may be sprayed onto the organic material and mixed using the propulsion units of boats, by towing a breaker board through the mixture or by agitating using water jets. Alternatively, if the organic material is on a solid surface, it may be treated, for example, by pouring the reactants onto small patches or spraying them over large areas and mixing them with the organic material using agricultural equipment, e.g. a rotary cultivator, or by simple manual mixing with a paddle or rake.

The invention is illustrated with reference to the following examples.

EXAMPLES 1 TO 10

Encapsulation of organic material in the absence of water

The effectiveness of a number of cross-linking agents was assessed using the method according to the present invention to encapsulate F28 light fuel oil in the absence of water.

The functionalised polymer used in the examples was a maleinised polybutadiene having a number average molecular weight of 8500 and maleinised to 10% by weight. The maleinised polybutadiene was used as a 50% solution in a solvent comprising 4 parts by weight of odourless kerosine to 1 part by weight of 2-ethoxyethyl acetate.

100 g of the 50% solution of maleinised polybutadiene were added to and mixed with 250 g of the light fuel oil and the mixture allowed to equilibrate at 25° C. for 2 hours. A stoichiometric amount of the cross-linking agent was then added to the mixture as a 50% solution in odourless kerosine. The mixture was stirred for 30 seconds and then approximately 50 grams were separated for testing in a Tecam gelation timer fitted with a 22 mm diameter piston. ("Tecam" is a trademark). The Tecam gelation timer was used to measure the gelation time, defined as that period of time between the addition of the cross-linking agent and the stopping of the reciprocating piston when the mixture forms a gel capable of supporting the weight of the piston. The hardness of the bulk of the mixture was measured one hour and 24 hours after the addition of the cross-linking agent. The hardness was determined according to the Institute of Petroleum standard test I.P.50 using a cone penetrometer fitted with a standard 150 g cone. The cone was placed on the surface of the mixture and the hardness recorded as distance (mm/10) which the point has penetrated after 5 seconds.

The gelation time and hardness are given in Table 1 for each of the cross-linking agents tested. Also given in the table is the amount of cross-linking agent required to give a molar ratio of the functional groups of the cross-linking agent to anhydride groups on the maleinised polybutadiene of 1:1.

TABLE 1

| | ENCAPSULATION OF ORGANIC MATERIAL IN THE ABSENCE OF WATER | | | | |
|---|---|---|---|---|---|
| Example No. | Cross-linking Agent | Amount (g) | Gelation Time (mins) | Hardness (mm/10) 1 hour | 24 hours |
| 1 | bis (2-hydroxyethyl)-tallow amine | 15.6 | 4.9 | 199 | 186 |
| 2 | bis (2-hydroxyethyl)-oleyl amine | 16.1 | 4.1 | 210 | 194 |
| 3 | polyoxyethylene (7)-tallowamine | 25.5 | 38.0 | 303 | 215 |
| 4 | N,N',N' tris (20-hydroxyethyl)-N-tallow-1,3 diamino propane | 13.5 | 1.8 | 163 | 153 |
| 5 | N,N',N'',N''—tetrakis (2-hydroxyethyl)-N—tallow-3,3' diamino-dipropylamine | 12.4 | 1.3 | 146 | 139 |
| 6 | N,N',N'—tris(2-hydroxylethyl)-N—oleyl-1,3-diaminopropane | 13.7 | 1.5 | 153 | 142 |
| 7 | N,N',N'—[polyoxyethylene (5)]-N—oleyl-1,3 diaminopropane | 16.4 | 2.9 | 179 | 160 |
| 8 | N,N',N'—[polyoxyethylene (10)]-N—oleyl-1,3-diaminopropane | 23.0 | 9.7 | 226 | 174 |
| 9 | N,N',N'—tris (2-hydroxypropyl)-N—oleyl-1,3-diaminopropane | 15.0 | 6.4 | 168 | 162 |
| 10 | N,N',N'—tris (2-hydroxybutyl)-N—oleyl-1,3-diaminopropane | 16.3 | 4.6 | 153 | 147 |

The results show that the reactants gel relatively quickly encapsulating the organic material in a relatively hard polymer network. The results also indicate that alkoxylated fatty diamines gel more rapidly than alkoxylated fatty monoamines and that increasing the extent of alkoxylation tends to increase the gelation time and decrease the hardness of the polymer network.

EXAMPLES 11 TO 15

Encapsulation of Organic Material in the Presence of Water

The effectiveness of a number of cross-linking agents was assessed using the method according to the present invention to encapsulate Forties crude oil, topped at 175° C., in the presence of water.

The functionalised polymer was the same maleinised polybutadiene as used in Examples 1 to 10 and was used as a 50% solution in the same solvent.

300 g of the crude oil were poured onto 1500 cm³ of an artificial sea water. The cross-linking agent was added to the oil and water as a 40% by weight solution in a solvent system comprising a 1:1 ratio of odourless kerosine and a base oil. The amount of cross-linking agent added was sufficient to react with all of the anhydride groups of 60 g of the maleinised polybutadiene i.e. the molar ratio of the functional groups of the cross-linking agent to the anhydride groups of the functionalised polymer was calculated to be 1:1. The oil, water and cross-linking agent solution were agitated for 20 seconds using a stirrer at 400 rpm. The mixture was then transferred into a separating funnel and the time taken for the oil layer and water layer to obtain constant volumes was measured. The two layers were then separated. The water layer was subjected to extraction with carbon tetrachloride to determine the amount of oil in the water. 120 g of the maleinised polybutadiene solution were added to the oil layer and the gelation time and hardness after one hour were determined as for Examples 1 to 10, except that the gelation time was measured from the addition of the maleinised polybutadiene solution. The results are given in Table 2 along with the iodine value for the fatty amines from which the cross-linking ble for the differences in the strengths of the gelled oil after 90 mins.

EXAMPLE 18

Extrusion of gelled oil through a net

One method of recovering gelled oil from the surface of water is to use a net. A simple test was carried out using the gelled oil produced according to Example 17 to assess the resistance of the gelled oil to extrusion through a net.

A 9 mm mesh net of 1 mm diameter polyester filaments was secured over one end of an open ended cylin-

TABLE 2

| | ENCAPSULATION OF CRUDE OIL IN THE PRESENCE OF WATER | | | | | |
|---|---|---|---|---|---|---|
| Example No. | Cross-linking Agent | Iodine Value of Fatty Amine | Oil/Water Separation Time (mins) | Wt of Oil extracted from water (g) | Gelation Time (mins) | Hardness after 1 hour (mm/10) |
| 11 | bis (2-hydroxyethyl)oleylamine | 80 | 3 | 1.7 | 5.9 | 192 |
| 12 | bis (2-hydroxyethyl)soyaamine | 70 | 4 | 3.2 | 3.8 | 199 |
| 13 | N,N',N'—tris (2-hydroxyethyl)-N—oleyl-1,3 diaminopropane | 70 | 6 | 1.4 | 5.9 | 372 |
| 14 | N,N'—N'tris (2-hydroxypropyl)-N—oleyl-1,3-diaminopropane | 70 | 7 | 1.4 | 5.2 | 174 |
| 15 | N,N',N'—tris (2-hydroxybutyl)-N—oleyl-1,3-diaminopropane | 70 | 3 | 0.5 | 3.9 | 180 | agents were derived. The examples illustrate that relatively hard polymer networks may be formed, encapsulating the crude oil, in less than 10 minutes.

EXAMPLE 16

Encapsulation of oil floating on water 6 liters of F28 light fuel oil were poured into a metal tank containing fresh water and allowed to form a 0.5 cm thick oil slick. A functionalised polymer and a cross-linking agent were sprayed over the oil for 21 seconds. The functionalised polymer used was the same 50% by weight solution of maleinised polybutadiene as used in Examples 1 to 10. The cross-linking agent was a 50% by weight solution of bis(2-hydroxyethyl)oleyl amine in a solvent mixture comprising odourless kerosine and a 150 solvent neutral base oil in a weight ratio of 1:1. 2.25 liters of the functionalised polymer solution and 0.45 liters of the cross-linking agent solution were added to the oil. 20 seconds after applying the polymer and cross-linking agent, the water was agitated using a fan jet attached to a mains water hose.

The oil was gelled in 15 minutes. The strength of the gel after 90 mins as measured by the Institute of Petroleum test method IP 50, was 261 mm/10.

EXAMPLE 17

Encapsulation of oil floating on water

Example 16 was repeated except that instead of spraying the functionalised polymer and cross-linking agent solutions onto the oil, they were applied by sparging.

The oil gelled within 5 minutes and the strength of the gel 90 minutes after applying and mixing the reagents to the oil, as determined by IP 50, was 169 mm/10.

Comparison of the results of this Example and of Example 16 shows that the method of applying the reagents can affect the rate of gelation. In both cases uniform gels were formed. The gelled oil produced by spraying the reagents onto the oil, contained a certain amount of entrained air which may have been responsider having an internal diameter of 55 mm. The cylinder was then supported vertically with the net over the lower end. Pieces of gelled oil were torn from the gelled product one hour after applying and mixing the reagents with the oil. The pieces were placed in the cylinder so that they rested against the net. A piston was then placed on top of the gelled oil and a force gradually applied to the piston until the gelled oil began to be extruded through the net. The force required to extrude the gelled oil through the net was found to be 1.2 tonnes per m$^2$. This shows that the gelled oil can be recovered using a net.

EXAMPLE 19

Encapsulation of drilling cuttings

North Sea shale drilling cuttings were separated from an oil based drilling mud. The oil contaminated cuttings were then shaken on a 30 mesh sieve for three minutes in order to simulate the treatment which such cuttings would receive in a primary shaker on an oil rig. The oil content of the shaken cuttings was determined by soxhlet extraction with carbon tetrachloride followed by infra red analysis. The oil content was found to be 15 300 g of oil per cubic meter of the drilling cuttings.

1.02 g of a 45% by weight solution of 2(hydroxyethyl)oleylamine in a 1:1 solvent mixture of a 150 solvent neutral base oil and odourless kerosine were added to and mixed with 50 g of the shaken oil contaminated drilling cuttings. 6 g of the same 50% by weight solution of maleinised polybutadiene as used in Examples 1 to 10 were then added to the mixture with stirring. The mixture was pressed into a petri dish and left to gel. After one hour, the gelled material was cut into 15 mm squares. 30 g of these squares were placed in a pear shaped flask with 300 cm$^3$ of 'Natura' synthetic sea water. The flask was then rotated for 200 hours after which time the oil content of the water was determined using soxhlet extraction with carbon tetrachloride and infra-red analysis. The amount of oil leached from the gelled cuttings was found to be 398 g/m$^3$ i.e. 2.6% by weight of the oil originally present in the cuttings.

The results show that oil contaminated drilling cuttings can be successfully gelled according to the method of the present invention and that the oil is not readily leached from the gelled cuttings.

EXAMPLE 20

The hydrolytic stability of an alkoxylated fatty amine was assessed by storing the cross-linking agent at 40° C. and periodically measuring the viscosity of the cross-linking agent and the rate of reaction with a functionalised polymer.

The alkoxylated fatty amine used was an N-oleyl-1,3-diaminopropane propoxylated to an extent of propoxylation of 3 moles per mole of diamine. The alkoxylated fatty amine was used as a 38% w/w solution in odourless kerosine. Two samples of the alkoxylated fatty amine were stored at 40° C., one of which contained 9 g of distilled water per 900 g of the cross-linking agent.

The rate of reaction of the cross-linking agent with a functionalised polymer was assessed by measuring the time taken to gel a sample of F28 light fuel oil. The functionalised polymer used was the same 50% solution of maleinised polybutadiene as used in Example 1 to 10. The functionalised polymer was used at a treatment level of 10% by weight based on the weight of the oil. A stoichiometric amount of the cross-linking agent was used and the gelation time measured using a Tecam gelation timer as described in Examples 1 to 10.

The results given in Table 3 indicate that the alkoxylated fatty amine is stable over the period of 14 months and that the inclusion of water does not adversely affect performance of the amine.

TABLE 3

| Alkoxylated Fatty Amine Solution | Initial | 1 month | 2 months | 6 months | 14 months |
|---|---|---|---|---|---|
| Without water | | | | | |
| Viscosity ($\times 10^{-3}$ Nsm$^{-2}$) | 6.2 | 6.1 | 6.1 | 6.2 | 6.2 |
| gel time (mins) | 15 | 13 | 13 | 13 | 13 |
| With water | | | | | |
| Viscosity ($\times 10^{-3}$ Nsm$^{-2}$) | 6.6 | 6.5 | 6.6 | 6.6 | 6.6 |
| gel time (mins) | 15 | 15 | 13 | 13 | 13 |

We claim:

1. A method of encapsulating organic material which is floating on, or in admixture with, water which method comprises reacting in the presence of the organic material and water (A) a functionalised liquid polymer containing anhydride functional groups which functional groups are derived from an alpha, beta-ethylenically unsaturated dicarboxylic acid anhydride and (B) a crosslinking agent, the functionalised polymer and a crosslinking agent being miscible with the organic material and capable of crosslinking to form a three-dimensional polymer network containing encapsulated organic material, and allowing a three-dimensional polymer network to form, wherein the crosslinking agent comprises an alkoxylated fatty amine selected from the group consisting of (a) an alkoxylated fatty monoamine having from 1.5 to 10 moles of alkoxylate per mole of fatty monoamine, the major proportion of alkoxylate groups being selected from ethoxylate and propoxylate groups and the alkoxylated fatty monoamine being derived from a fatty amine having an iodine value of at least 45, (b) an alkoxylate fatty polyamine having from 2.5 to 15 moles of alkoxylate per mole of fatty polyamine, the major proportion of alkoxylate groups being selected from ethoxylate and propoxylate groups and the alkoxylated fatty polyamine being derived from a fatty amine having an iodine value of at least 45, (c) an alkoxylated fatty monoamine having from 1.5 to 10 moles of alkoxylate per mole of fatty monoamine, the major proportion of the alkoxylate groups having at least four carbon atoms and the alkoxylated fatty monoamine being derived from a fatty amine having an iodine value of at least 10 and (d) an alkoxylated fatty polyamine having from 2.5 to 15 moles of alkoxylate per mole of fatty monoamine, the major proportion of the alkoxylate groups having at least 4 carbon atoms and the alkoxylated fatty polyamine being derived from a fatty amine having an iodine value of at least 10.

2. A method as claimed in claim 1 in which the alkoxylated fatty monoamine or polyamine having a major proportion of ethoxylate and/or propoxylate groups are derived from fatty amines having an iodine value of at least 60.

3. A method as claimed in claim 1 in which the alkoxylate fatty monoamines or polyamines having a major proportion of alkoxylate groups with at least 4 carbon atoms are derived from fatty amines having an iodine value of at least 30.

4. A method as claimed in claim 1 in which the alkoxylate groups of the alkoxylated fatty amines are selected from the group consisting of ethoxylate propoxylate and butoxylate groups.

5. A method as claimed in claim 1 in which the alkoxylated fatty monoamine or polyamine is derived from a fatty amine having an iodine value of at least 65.

6. A method as claimed in claim 1 in which the crosslinking agent comprises at least one alkoxylated fatty amine having the general formula;

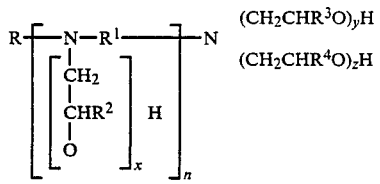

where R is a hydrocarbyl group having from 8 to 22 carbon atoms $R^1$ is $(CH_2)_3$ or $CH_2CH(CH_3)CH_2$, $R^2$, $R^3$ and $R^4$ are the same or different and are H, $CH_3$ or $CH_2CH_3$, n is 0 or a positive integer from 1 to 3, x, y and z are the same or different and are 0 or a positive integer from 1 to 6, where at least one of x,y or z=1 and the sum of nx,y and z is from 1.5 to 15.

7. A method as claimed in claim 1 in which the crosslinking agent comprises at least one alkoxylated fatty amine selected from the group consisting of (a) an ethoxylated fatty monoamine having an extent of ethoxylation of from 1.5 to 4, the ethoxylated fatty monoamine being derived from a fatty amine having an iodine value of at least 60, (b) a propoxylated fatty monoamine having an extent of propoxylation of from 1.5 to 3, derived from a fatty amine having an iodine value of at least 60,
(c) a butoxylated fatty monoamine having an extent of butoxylation of from 1.5 to 6, derived from a fatty amine having an iodine value of at least 30,
(d) an alkoxylated fatty polyamine having from 2.5 to 6 moles of alkoxylate groups selected from ethoxylate, propoxylate and butoxylate groups per mole of fatty polyamine, the alkoxylated fatty polyamine being derived from a fatty amine having an iodine value of at least 60.

8. A method as claimed in claim 1 in which the crosslinking agent comprises at least one alkoxylated fatty amine selected from the group consisting of
bis(2-hydroxyethyl)oleylamine,
bis(2-hydroxyethyl)soyaamine,
N,N',N'-tris(2-hydroxypropyl)-N-oleyl-1,3-diaminopropane,
N,N',N'-tris(2-hydroxybutyl)-N-oleyl-1,3-diaminopropane,
N,N',N'-tris(2-hydroxyethyl)-N-soya-1,3-diaminopropane.

9. A method as claimed in claim 1 in which the functionalised polymer is selected from the group consisting of maleinised polybutadiene, maleinised polyisoprene, maleinised EPDM rubber and maleinised natural rubber.

10. A method as claimed in claim 1 in which the organic material is a liquid organic material selected from the group consisting of crude oil, petroleum products, halogenated hydrocarbons, organophosphates and benzene.

11. A method as claimed in claim 1 in which the organic material is a solid contaminated with an organic material.

12. A method as claimed in claim 1 in which the functionalised polymer and the crosslinking agent each have a viscosity of up to $2 Nsm^{-2}$ at 25° C.

* * * * *